United States Patent [19]
Nishimura et al.

[11] Patent Number: 6,103,373
[45] Date of Patent: Aug. 15, 2000

[54] CARBON FIBER MATERIAL AND ELECTRODE MATERIALS AND METHOD OF MANUFACTURE THEREFOR

[75] Inventors: Kunio Nishimura; Akinori Sudo; Mahito Murakami, all of Kawasaki; Koro Shirane, Chiba, all of Japan

[73] Assignee: Showa Denko K.K., Tokyo, Japan

[21] Appl. No.: 09/052,014

[22] Filed: Mar. 31, 1998

[51] Int. Cl.[7] .............................. B32B 9/00; D01F 9/12; C01B 31/00

[52] U.S. Cl. .................. 428/368; 423/447.2; 423/445 R

[58] Field of Search ........................... 423/447.3, 447.1, 423/445 R, 447.2; 502/180, 185; 429/231.3, 231.8; 428/368

[56] References Cited

U.S. PATENT DOCUMENTS

| | | | |
|---|---|---|---|
| 4,975,261 | 12/1990 | Takabatake et al. | 423/445 R |
| 5,691,054 | 11/1997 | Tennent et al. | 423/447.1 |
| 5,726,116 | 3/1998 | Moy et al. | 423/447.3 |
| 5,776,633 | 7/1998 | Mrotek et al. | 429/231.8 |
| 5,837,081 | 11/1998 | Ting et al. . | |
| 5,853,865 | 12/1998 | McHugh et al. | 423/447.3 |

FOREIGN PATENT DOCUMENTS

| | | | |
|---|---|---|---|
| 52-103528 | 8/1977 | Japan | D01F 9/14 |
| 58-180615 | 10/1983 | Japan | D01F 9/12 |
| 60-54998 | 3/1985 | Japan | C30B 29/62 |
| 60-215816 | 10/1985 | Japan | D01F 9/12 |
| 61-29149 | 2/1986 | Japan | H01L 21/76 |
| 62-90863 | 4/1987 | Japan | H01M 4/58 |
| 63-18761 | 1/1988 | Japan | H04N 1/04 |
| 63-21208 | 1/1988 | Japan | C01B 31/04 |
| 63-283766 | 11/1988 | Japan | B02C 19/06 |
| 1-227417 | 9/1989 | Japan | H01G 9/00 |
| 1-270543 | 10/1989 | Japan | C04B 14/38 |
| 1-272827 | 10/1989 | Japan | D01F 9/14 |
| 1-290570 | 11/1989 | Japan | C04B 38/00 |
| 3-4458 | 1/1991 | Japan | H01M 10/12 |
| 4-155776 | 5/1992 | Japan | H01M 10/40 |
| 4-222227 | 8/1992 | Japan | D01F 9/127 |
| 4-237971 | 8/1992 | Japan | H01M 10/40 |
| 6-32607 | 2/1994 | Japan | C01B 31/04 |
| 7-150419 | 6/1995 | Japan | D01F 9/127 |
| 7-249551 | 9/1995 | Japan | H01G 9/058 |
| 7-307250 | 11/1995 | Japan | H01G 9/058 |
| 09132846 | 5/1997 | Japan | D04H 1/42 |

*Primary Examiner*—Steven P. Griffin
*Assistant Examiner*—Michael Rhee
*Attorney, Agent, or Firm*—Sughrue, Mion, Zinn, Macpeak & Seas, PLLC

[57] ABSTRACT

A carbon fiber material is substantially constituted by fiber agglomerates, having agglomerate sizes in a range of not less than 5 $\mu$m and not more than 500 $\mu$m, formed by vapor grown carbon fibers having a diameter of not less than 0.05 $\mu$m and not more than 5 $\mu$m, having a microstructure such that some fiber contact points are bonded together with substances produced by carbonizing carbonaceous matters. This carbon fiber material is used as a filler material to various matrices, and used also as an electrode material for making electrodes in batteries, especially in electric double-layer capacitors, and in secondary batteries, especially those based on lithium or lead.

9 Claims, 5 Drawing Sheets

CARBON FIBER MATERIAL AND ELECTRODE MATERIALS AND METHOD OF MANUFACTURE THEREFOR

BACKGROUND OF THE INVENTION

1. Field of the Invention

The present invention relates to filler materials for adding to various matrix materials, and capacitors, especially for making electrodes for electric double-layer capacitors, secondary batteries, especially lithium- and lead-based secondary batteries.

2. Description of the Related Art

Carbon fibers produced in vapor phase (vapor grown carbon fibers) are added as a filler agent to various polymeric materials, organometallic materials as well as metals and ceramics to improve their properties such as electrical conductivity, frictional characteristics, thermal conductivity and mechanical strength.

In general, vapor grown carbon fibers (VGCF) are available in dimensions of 0.05~5 $\mu$m diameter and 1~1,000 $\mu$m length, and their features include well developed graphitic cell surfaces along the fiber axis and hollow interior. In the as-grown condition, these micro-fibers assume a cluster form of a low apparent density.

In general, carbonaceous substances such as tar and pitch remain in such fiber clusters, which can be carbonized by heating and such converted materials are removed as necessary. This heating process improves the properties of the carbon fibers thus produced.

Specific heating procedures for such vapor grown carbon fibers include, for example, a method based on continuous or intermittent heating of carbon fibers in a heat resistant container (Japanese Patent Application, First Publication (A), H1-272827); a method based on kneading fiber clusters and heating (Japanese Patent Application, First Publication (A), H1-270543); and a method based on heating the carbon fibers molded into certain shapes (Japanese Patent Application, First Publication (A), H1-290570).

When the carbon fiber clusters are to be used as a filler in high molecular weight materials, it is necessary that the fiber clusters be ground to a powder. A specific example includes grinding the carbon fiber clusters minutely with the use of a jet mill (Japanese Patent Application, First Publication (A), S63-21208 and Japanese Patent Application, First Publication (A), S63-283766), and highspeed rolling in a grinding mixture of balls of less than 10 mm diameter, made of ceramics such as zirconia and alumina and hard metals (Japanese Patent Application, First Publication (A), H6-32607). A method based on grinding the singular fibers themselves is also disclosed (Japanese Patent Application, First Publication (A), H4-222227).

Although the vapor grown carbon fibers themselves exhibit good electrical and thermal conductivity properties, the present state of the art is such that when they are used as a filler material in making polymeric composite products, their favorable electrical and thermal conductive are not reflected in the properties of the composite product made therewith.

In considering a case of improving the electrical conductivity of a composite product, the filler should be generally in a form of fibers because it is believed that the conductivity paths should be made long.

However, the longer the fibers the higher the tendency for the fibers to orient in a preferred direction, and a resin mixture having such a fiber alignment depresses the fluidity and consequently the formability of the composite feed.

The result is that the present practice is to use whisker fibers that are microscopic such as those as-grown fibers or milled singular fibers made therefrom. Especially, it is considered that preferred fibers are singular fibers that have aspect ratios of greater than 10 preferably more than 100 and have the length dimensions in the range of several tens of microns.

However, as the fibers become smaller, the number of contact points of the fibers also increases and the electrical contact resistance is increased. Furthermore, contact points of the fibers are vulnerable to infiltration by the matrix resin during molding, and the electrical conductivity of the composite product is ultimately degraded.

Regarding the method of heating the carbon fibers in a heat resistant container or the method based on kneading fiber clusters and heating mentioned above, the difficulty has been that the density of the fiber cluster is low because of insufficient pressure, so that not only the fiber contact points are few but bonding at the fiber contact points is insufficient.

Regarding the method of grinding the fibers minutely, the difficulty has been that, because the fibers are milled too fine, too many fiber contact points are created, which increase the electrical contact resistance. When such a composite feed is formed into a product, the fiber contact points are broken by the infiltrated resin during the molding process, resulting that the electrical conductivity cannot be increased.

The above Japanese Patent Application, First Publication (A), H1-290570 discloses a method of forming and sintering of the fibers, but the fibers are meant to be used for thermal insulation, and are not for use as a filler material.

Therefore, it can be understood that the VGCF at the present time are not able to demonstrate their full potential in improving the electrical and thermal conductivity characteristics of composite materials.

Fibrous fillers themselves exhibit an effective electrical conductivity in two-dimensions because of their lengthwise geometry, but, in a composite material, it is required that the electrical conductivity property be improved in three-dimensions. It follows that the fibrous material for making a composite product should have a structure such that the properties are isotropic in three-dimensions and that the conductivity path be as long as possible. It may be considered that, to simply increase the path lengths in three-dimensions, larger particles would be preferable. However, large particles are not suitable as a filler material because, when added to a matrix, such large particles not only diminish the contact point per unit volume of the matrix but adversely affect the formability and strength properties of the composite product.

Therefore, to increase the electrical conductivity in a composite product while retaining the strength and formability properties of the composite material, it is desirable to have a fibrous structure that creates a functional three-dimensional structure with a high number of contact points which retains the integrity of the electrical conductive paths.

Such a filler material comprised by vapor grown carbon fibers and has an ideal fiber structure is not available currently.

In recent years, there have been developments and commercialization of charge storage devices based on electric double-layers, that is, electric double-layer capacitors derived from the electric double-layer principle. Because of high static capacitance achievable in electric double-layer capacitors, in small size capacitors are suitable as backup electrical source for semiconductor memories in electronic apparatus while large devices are even starting to be used as a part of lead storage batteries for vehicular power applications.

Generally speaking, carbon electrodes are used in electric double-layer capacitors. These electric double-layer capacitors utilize electric double-layers formed near the interfaces between the electrode surface and electrolyte, therefore, it is necessary to increase the surface area of the carbon electrodes.

For this reason, various electrode designs have been proposed such as, for example, carbon electrodes made of activated charcoal particles having micro-porosities (Japanese Patent Application, First Publication (A), S63-18761: and Japanese Patent Application, First Publication (A), H1-227417); carbon electrodes produced by heating a polyvinylidene chloride resin in a non-oxidizing atmosphere so as to generate atomic and molecular faults to form micro-porosities (Japanese Patent Application, First Publication (A), H7-249551).

On the other hand, electrode plates of high capacitance require not only high electrode surface area (i.e. specific surface area) but also high electrical and thermal conductivities.

However, the activated charcoal particles mentioned above have low crystallinity and the electrical resistance of the material itself is high, and it is difficult to obtain sufficient electrical conductivity from the electrodes made from such activated charcoal particles because of the high inter-particle electrical contact resistance.

For this reason, there has been a proposal for an electric double-layer capacitor which used electrodes having activated charcoal particles and carbon whiskers (Japanese Patent Application, First Publication (A), H7-307250).

However, although a filler material containing singular form of fiber carbon whiskers provides two-dimensional conductance effects, as discussed above, it does not provide sufficient conductance in three-dimensions. It is better and preferable that the electrode plates for electric double-layer capacitor be uniform in their overall three-dimensional properties.

To improve the electrical conductivity, a filler material should have a structure exhibiting isotropic properties in three dimensions and provide as long a conductive distance as possible, and additionally, it is preferable that the filler material should have a web-like structure that enables to support sufficient quantity of activated charcoal particles.

However, at the present time, there is no electrode material to fulfill such requirements for making high performance electric double-layer capacitors.

Some secondary batteries, in particular lithium- or lead-based secondary batteries, use electrodes containing carbon fibers, especially VGCF.

For example, negative electrodes, in lithium ion secondary batteries, made from a mixture of VGCF and graphite powder obtained by high temperature processing of cokes are known (Japanese Patent Application, First Publication (A), H4-155776).

Also, negative electrodes in lithium ion secondary batteries made from a mixture of meso-carbon microbeads and VGCF are known (Japanese Patent Application, First Publication (A), H4-237971).

These lithium secondary batteries are said to prevent expansion of the electrode active material such as graphite powder, thus suppressing grid deformation and fracture generated during repeated charge/discharge cycles, thereby resisting degradation of their charge storage capacity.

However, in such conventional electrode materials, because the graphite powder and like others and VGCF exist simply in a mechanically blended form, the carbon fibers are not able to sufficiently suppress destruction of the electrodes by grid expansion, and it is insufficient to prevent the consequent loss of capacity degradation.

SUMMARY OF THE INVENTION

It is an object of the present invention to provide a carbon fiber material that can be used as a filler material to improve thermal and electrical conductivities of a composite product containing the carbon fibers.

To effectively utilize the properties of the carbon fibers to improve the electrical and thermal conductivities of a composite product, it is desirable that the filler material provide a functional three-dimensional structure such that the fibers, which are longer than singular whisker fibers, are bonded to provide bridging paths for the fibers. The bulk density should be made as high as possible because the higher the density the greater the number of fiber contact points and higher the conductivity.

Examinations of various methods for making carbon fiber material having a functional three-dimensional structure, from singular or branching fibers made by vapor phase growth methods, have led to a discovery that such a material can be made as follows. Carbon fiber clusters are first press molded to produce a fiber compact to increase the fiber contact points, and the pressed compact is heat treated to bond the fibers by carbonizing the contact points, the heated compacts are then pulverized to obtain a material comprised substantially of carbon fiber agglomerates that are comprised by flocs-like fibers.

The carbon fiber material thus produced is comprised substantially by an agglomerated structure of fibers, having agglomerate sizes in a range of not less than 5 $\mu$m and not more than 500 $\mu$m, formed by vapor grown carbon fibers having a diameter of not less than 0.05 $\mu$m and not more than 5 $\mu$m wherein at least a fraction of fiber contact points are bonded together with substances produced by carbonizing carbonaceous matters.

The carbon fiber material is produced by a method comprising the steps of: making carbon fibers having a diameter of not less than 0.05 $\mu$m and not more than 5 $\mu$m by a vapor phase growth method; press forming of carbon fibers obtained to produce compacts having an apparent density of not less than 0.02 g/cm$^3$; heating the compacts at a temperature of not less than 600° C., preferably not less than 800° C.; pulverizing heat treated compacts by shear or compressive forces to produce fiber agglomerates having agglomerate sizes ranging from not less than 5 $\mu$m and not more than 500 $\mu$m.

It is desirable that the fiber compacts be press formed at a compaction pressure of not less than 0.1 kg/cm$^2$.

The carbon fiber material of the present invention is comprised substantially by agglomerated structures of vapor grown micro-fibers, resembling flocs, which are strongly bonded at the fiber contact points. The spatial continuity of the structure promotes a superior electrical conductivity because of the functional three dimensional fiber structure. The agglomerates are limited in their sizes and exhibit excellent dispersive properties when they are used as a filler material in a polymeric resin. Because the fibers are bonded, the structural integrity is maintained even when they are made into a composite product, thus leading to superior electrical conductivity in the composite product.

An application of the carbon fiber material as an electrode material for an electric double-layer capacitor comprised by a carbon powder having a specific surface area of not less than 500 m²/g and carbon fibers in a range of 0.1 weight percent to 30 weight percent, wherein the carbon fiber materials are comprised substantially by fiber agglomerates, comprised by flocs-like fibers, having agglomerate sizes in a range of not less than 5 μm and not more than 500 μm, formed by vapor grown carbon fibers having a diameter of not less than 0.5 μm and not more than 5 μm wherein at least a fraction of fiber contact points are bonded together with substances produced by carbonizing carbonaceous matters.

In such an electrode material, activated charcoal powder which is the electrode active material is incorporated into the interstices of the flocculated fiber agglomerates or is enmeshed into the fiber agglomerates of branching carbon fibers so that the probability of contacts between the charcoal particles and the carbon fibers is increased, thereby leading to increased electrical conductivity. Therefore, the internal resistance is lowered and current can flow quite readily. The activated charcoal particles are thus effectively utilized for electrolyte reaction and the charge storage capacity of the condenser is increased.

Furthermore, because the charcoal particles are enmeshed into the interstices of the fiber agglomerates which resemble flocs or a web-structure, destruction of the electrode plates is prevented, by accommodating grid expansion due to heat generated during charge/discharge cycles, and preventing separation and falling out of the particles from the electrodes. The result is that the charge storage capacity of the battery is preserved and the service life is prolonged.

The electrode material for electric double-layer capacitor exhibits excellent electrical conductivity in three-dimensions because of the flocculated vapor grown carbon fibers providing spatial electrical paths in the electrodes. The capacity/volume ratio is also superior, and the charcoal particles enmeshed inside the flocculated carbon fiber grids produce high strength.

Another application of the carbon fiber material is a battery electrode material comprised by a composite material having an electrode active material included within micro-pores in fiber agglomerates formed by tangled masses of vapor grown carbon fibers. It is preferable that the agglomerate structure is produced by press forming of branching carbon fibers produced by a vapor growth technique, heating the fibers compacts and pulverizing the compacts.

In the battery electrode material, the electrode active material other than graphite powder may be used. It may be a lithium-based oxide composite, such as $LiCoO_2$. In this case, it is preferable to also incorporate carbon powder as conductivity enhancing substances such as carbon black, graphite powder within the interstices of the agglomerate structure.

As the electrode active material, graphite powder or the like are used. Also, other electrode active materials may include powder of lead dioxide or metallic lead. In this case, the electrode material is suitable for sealed type secondary batteries.

The electrode material of the present invention is suitable for making positive and negative electrodes in lithium ion-based secondary batteries and sealed type lead-based secondary batteries.

The electrodes made by the electrode material of the present invention are durable because the electrode active material is incorporated within the interstices of the agglomerate structure such that the expansion of the grids caused by charge/discharge cycles of the electrode active material is controlled, thereby preventing deformation and destruction of the electrode.

The agglomerate structure is produced not only by mutual mechanical contact of the fibers but also by a tangled, flocculated mass of fibers which are partially bonded chemically at the fiber contact points, therefore, the electrical resistance of the agglomerate structure is low, and the internal resistance of the electrode produced therefrom is also lowered.

The electrode material of the present invention can generate a large number of electrical contacts by providing an increased probability of electrical contacts between the charcoal particles and the carbon fibers because of the special agglomerate structure produced by including the electrode active material within the interstices of the agglomerates and enmeshing the particles with the fine fibers. Also, because the agglomerate structure itself has a low resistance, the internal resistance of the battery made therewith is low, and the active material is fully utilized to produce an effective electrolytic reaction, thereby increasing the charge storage capacity of the battery.

When a graphite powder is used as the active material, grid expansion caused by charge/discharge cycles of the graphite powder is controlled, thereby preventing electrode expansion and deformation to increase the number of useful cycles, thereby increasing the service life of the battery.

DETAILED DESCRIPTION OF THE PREFERRED EMBODIMENTS

Figure 1:
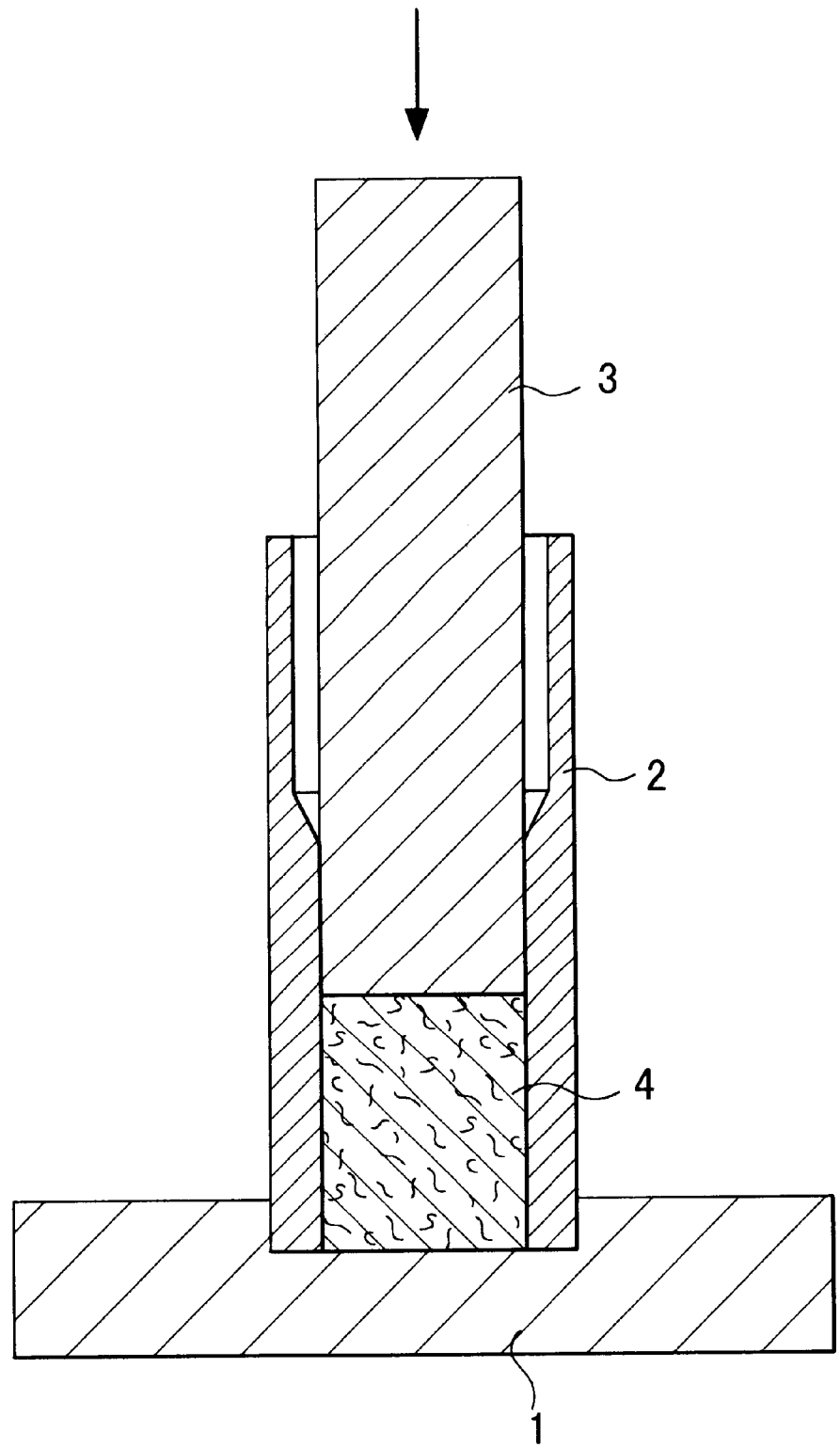
FIG. 1 is a cross sectional view of an example of molding apparatus for vapor growth carbon fibers.

A flocs-like agglomerate structure comprised of VGCF in a three-dimensional network is produced by first compressing fiber clusters of VGCF which includes highly branching fibers to increase its density and join the fibers. The fibers to be used in this step may be singular fibers which are not branching, but the branching type of fibers are preferable because of their tendency to twine other fibers.

The VGCF are normally produced by introducing carbon sources such as hydrocarbon (such as benzene, toluene, natural gas) and carbon monoxide, in a liquid or gas form, along with a carrier gas into a reaction furnace at 800~1300° C., in the presence of a catalyst (transition metal including Fe, or its compound), to carry out a decomposition reaction.

Practical examples of making the vapor grown carbon fibers have been disclosed in various patent documents, for example: ① a method based on sprinkling seed crystals of ultra-fine particles of a transition metal on a substrate held in the thermal decomposition furnace (Japanese Patent Application, First Publication (A), S52-103528); ② a method based on making seed crystals by vaporizing transition metal compounds, such as ferrosen (a Japanese patented alloy containing transition metals), and admitting the vapor into a thermal decomposition furnace to produce fine powders of the transition metal (Japanese Patent Application, First Publication (A), S60-54998); ③ a method based on making seed crystals by directly vaporizing transition metals, such as iron, in a decomposition furnace (Japanese Patent Application, First Publication (A), S61-29149); ④ a method based on making seed crystals by dispersing or dissolving transition metals such as ferrosen in a liquid organic compound and spraying directly into a decomposition furnace (Japanese Patent Application, First Publication (A), S58-180615).

To produce a three-dimensional agglomerate structure from VGCF, the fiber cluster is first press formed to increase its density thereby joining the fibers. The fibers to be used in this operation may be branching fibers or singular fibers without much branching, or a mixture of both types. The VGCF feed may be made by any one of the methods presented above, but the fiber diameter should be more than 0.05 μm and less than 5 μm, preferably between 0.1 to 1 μm. This is because, the fibers of diameter less than 0.05 μm are susceptible to breaking during the compression process, and the fibers of diameter larger than 5 μm are not only difficult to be molded but do not exhibit properties suitable for a filler. The fiber length should be between 1~1,000 μm.

The VGCF for press forming purposes may be heat treated fibers, but it is preferable to start with as-grown fibers produced by a vapor growth process, which have not been subjected to a heat treatment (i.e. crude fibers).

The surfaces of crude fibers contain areas where the process of surface crystal formation has not been fully developed, and furthermore the fiber surfaces are covered with adsorbed unreacted organic compounds including tar and pitch.

The quantity of such unreacted organic compounds depends somewhat on the production condition, but generally it is in a range of 5~20 weight percent (w/o). When producing crude VGCF, such unreacted organic compounds act as a binder and when the crude fibers are heat treated, they readily convert to carbonaceous substances to bond the fibers together.

When the starting material is heat treated fibers or crude fibers containing a less than required amount of organic material in the fiber cluster, it is preferable to add, before the pressing step, a binder substance (for example, pitch) which would readily convert to a carbonaceous substance during heat treatment.

Both singular fibers without branches and branching VGCF respond to application of compression, and are easily snared and agglomerated so that the fiber clusters can easily be compressed to increase the density.

Any type of pressing process can be used so long as some pressure compaction can be employed. Such methods as compressive forming and extrusion forming can be employed but, as will be demonstrated in later embodiments, compressive molding of the fiber cluster using a mold is easy to perform. Any type of compressive molding techniques may be used so long as the fibers are subjected to compression. For example, compression plates or plunger molding, screw molding or disc pelletizing may be employed, but extrusion processes such as the plunger molding and compression plate techniques are relatively easy to perform.

The fiber clusters are moldable, and they can be formed into various shapes including right cylindrical or rectangular shapes, but industrially, it is preferable to have a shape that can be handled easily so that cylindrical or angular shapes convenient for heat treating process are preferable.

The size of the pressed compacts should be larger than 3 mm, preferably more than 5 mm, because the fibers are vulnerable to breaking by compressive pressure if they are too small.

The compaction pressure is selected by considering the pressure and the apparent density desired in the molded product. In practice, the pressure should be higher than 0.1 kg/cm$^2$, preferably higher than 1.0 kg/cm$^2$ should be sufficient. High pressure is acceptable but its magnitude should be such as to avoid fiber breakage, and also, if the pressure is high, the equipment system becomes expensive, so that the preferred ranges of pressures are, 0.1~100 kg/cm$^2$, more preferably 1~100 kg/cm$^2$, and most preferably 1~50 kg/cm$^2$.

The apparent density of the pressed compacts depends also on the density of flocculated carbon fibers. The apparent density of as-grown VGCF is very small, about 0.001~0.005 kg/cm$^3$, but the density is raised by press forming. The apparent density, for improved properties and ease of handling, should be higher than 0.02 kg/cm$^3$. If the apparent density is less than 0.02 kg/cm$^3$, heat treatment of the pressed compacts is difficult and the resulting properties are unsatisfactory and properties adequate for a filler are not developed.

The pressed compacts are next subjected to a heat treatment. Heat treatment is carried out under normal atmospheric pressure or higher by transferring the pressed compacts to a heating zone, for example. The resident times in the furnace are selected to ascertain that the temperature at the center of the pressed compacts reaches above a target temperature. Any normal heating methods can be used, such as external heating methods including high frequency heating, resistance heating or high temperature gas furnace, direct heating by high temperature gas or current heating may be used so long as the target temperature is reached. The heat treating temperature is selected by the ultimate properties required in the application, preferably higher than 600° C. and more preferably between 800~3,500° C.

The material for the heat treating furnace is selected by the treatment temperature but for temperatures above 2,000° C., carbonaceous material such as graphite is most suitable.

As described above, forming and heat treating steps may be carried out separately or concurrently. For example, in the pressing process can be arranged such that molding apparatus may be provided with a heating device so that heating can be carried out while applying a suitable pressure.

When the heating temperature exceeds 600° C., and especially above 800° C., the reactivity of carbon itself begins to increase. For this reason, it is preferable use helium, argon, xenon, krypton or other inert gases to prevent a reaction between the VGCF and the atmosphere, or in some cases a reducing atmosphere using hydrogen is preferable. Therefore, it is necessary to make a provision for atmosphere adjusting devices such as admitting and exhausting operations for the inert gas.

An important feature of the present method of making a VGCF material is that it is started with a preparation of VGCF clusters which are subjected to a forming process to produce fiber compacts. The fiber compacts are then heat treated, followed by pulverizing of the heat treated fiber compacts to produce fiber particles having a three-dimensional network, in a given range of dimensions. The pulverized particles flocculate to form an agglomerate structure having tangled fibers of fiber sizes (maximum diameter section) between 5 μm to a maximum of 500 μm, preferably between 10~200 μm.

The tangled fibers are branching type fibers, and at least some portion of the contact points of the tangled fibers are bonded by carbonaceous substances such as tar and pitch. Also, because the pulverized material has been previously compressed and heated, the pulverized fibers contain more contact points which are more strongly bonded to each other compared with the fibers which have not been subjected to compaction. Therefore, when made into composite products, such a fiber material strongly retain a flocculated structure therein and can disperse themselves easily in the product.

When the size of the flocs-like agglomeration is less than 5 μm, a composite product made with such a filler material lacks good electrical conductivity, and when the size is larger than 500 μm, the dispersive Quality of the feed material is degraded, which is reflected in the poor electrical conductivity of the composite product.

Method of pulverizing is not particularly restricted so long as the method retains the size of the flocs agglomeration. Pulverization of the fiber compacts may be carried out in one step but they may also be pulverized in a combination of two or more pulverizers. For example, the fiber compacts may be rough milled to particles of less than several tens of mm using a compressive type, shearing type or impact type pulverizer, followed by further milling process using a roll mill, screw mill, stamp mill or highspeed spin mill, or screen mill hammer mill to produce particles of between 5~500 μm.

The pulverized carbon fiber material has a three-dimensional structure containing flocculated agglomerates and a plurality of contact points. It is preferable that the number of contact points be a minimum of five or preferably more than ten bonded points in one agglomerate structure.

The pulverized carbon fiber material is chiefly comprised by the agglomerates of fibers described above, but other constituents include those fibers that have been broken down to singular fibers. The proportion of these singular fibers should be less than 30 w/o and preferably less than 10 w/o. Singular fibers may be removed by a classification process, but the material containing such singular fibers is useable for making carbon fiber material. Some singular fibers are desirable because they act to increase the electrical conductivity by serving to join the agglomerates when composite products are impregnated with a resin.

The carbon fiber material comprised mostly by fiber agglomerates is most suitable as a filler material for making various matrix materials based on, for example, organic polymer materials, organo-metallic materials, various ceramic and metallic materials, to optimize their functional properties, such as electrical conductivity, thermal conductivity, frictional and strengths characteristics.

The stock materials for making the electrodes of the present invention for use in electric double-layer capacitors are the carbon fiber material described above and carbon powders.

The carbon powder for making the electrodes of the present invention for use in electric double-layer capacitor may include various types of carbon powders. For example, activated charcoal powder made from petro-cokes, coal-cokes, coconut shells or phenol resin powder and polyvinylidene chloride resin powder.

It is preferable that the carbon powder has a specific surface area of more than 500 m²/g. When the surface area is less than 500 m²/g, the area of the electrodes in the electric double-layer capacitor is not sufficient for proper ion adsorption, and the charge storage capacity of the condenser is degraded.

As described earlier, the VGCF feed should have fiber diameter of more than 0.05 μm and less than 5 μm, more preferably between 0.1~1 μm. Especially for the electrode material in the electric double-layer capacitor, fibers of diameters larger than 5 μm cannot easily penetrate into the interstices of the main ingredient, which is activated charcoal powder particles of an average particles size of less than 20 μm, resulting in difficulties of forming a web-structure and distributing themselves uniformly on thin electrode plates. Fiber diameters less than 0.05 μm are not desirable because the surface area is so large that susceptibility for defect generation during the sintering or the process of graphitization is also increased so that the fiber strength is lowered, and it becomes difficult to form the web-structure when electrode is formed using such a material, resulting less the effect of lowering the electrical resistance.

It is preferable that the length of the fibers be more than 5 μm and less than 100 μm. Especially for use as the material for making electrodes for electric double-layer capacitors, when the fiber length exceeds 100 μm, the apparent density becomes small and the material becomes difficult to handle and tends not to distribute uniformly in the electrode. When the fiber length is less than 5 μm, it becomes difficult to position more than two particles of activated charcoal (because the size of the particle is less than 20 μm) which is the main ingredient, and the additive effect is negated.

In making electrodes for the electric double-layer capacitors, the size of the fiber agglomerates of less than 5 μm are unsuitable because even when they penetrate into the interstices of the activated charcoal particles, they are too small to effectively bridge the contacts between the charcoal particles so that the electrical conductivity is degraded. When the size of the fiber agglomerates exceeds 500 μm, the agglomerates are too large for effective particle packing, and the density is lowered and the capacity is degraded. Furthermore, the effect of lowering the electrical resistance cannot be achieved, because the inter-particle contact points become difficult to be formed.

It is preferable that the electrical resistance of the carbon powder feed (of a bulk density of 0.08 g/cm³) for making the fiber material be less than 0.3 Ωcm and more preferably less than 0.1 Ωcm. The resistance value higher than 0.3 Ωcm is not desirable because electrode plates made from such a powder do not provide the effect of lowering the electrical resistance of the composite product.

The carbon fiber material comprised mainly of VGCF in the fiber agglomerates having the specific surface area exceeding 20 m³/g is not desirable because of the loss of electrical conductivity.

The amount of the fiber material, comprised mainly of VGCF in the fiber agglomerates, to be added is between 0.15~30 w/o. When the amount of addition exceeds 30 w/o, the volume of the carbon fiber is too high and the amount of the electrode active ingredient which is the activated charcoal particles is reduced, the effect becomes reversed and the charge storage capacity begins to drop. When the amount is less than 0.1 w/o, the effect of providing increased contact points to the activated charcoal particles is lessened so that the electrical resistance cannot be lowered, resulting in not producing improvement in the charge storage capacity.

The electrode material of the present invention for use in making battery electrodes is a composite material comprised of an agglomerate structure formed by a tangled mass of VGCF whose cavities are filled with activated charcoal powder. Thus, it is preferable that the agglomerates is made of carbon fiber material described above and contain internal micro-cavities of various cavity sizes.

The electrode active material to be used in the composite capacitors of the present invention is graphite powder for a negative electrode in the lithium ion secondary battery. The graphite powder should have a layer structure to enable the lithium ions to be intercalated, and the preferred material has a plane spacing (d002) of less than 0.34 nm. The average particle diameter of the graphite particles should be between 1~30 μm, preferably between 2~10 μm.

The mixing ratio of the fiber agglomerates to the graphite powder should be such that the agglomerate portion is between 3~20 w/o of the total weight of the mixture. When the ratio is less than 3 w/o, the effect of using the agglomerate feed is not observed, and when the ratio exceeds 20 w/o, the amount of graphite is reduced and the battery capacity is degraded.

It is important that the graphite powder and the agglomerate feed be mixed thoroughly, and after mixing, the graphite particles should be in such a condition that they are attached to the carbon fibers in the agglomerate feed, that they are incorporated in the interstices of the fiber agglomerate or that they are further enmeshed to form a tangled structure.

To produce such a structure, mixing is carried out in Henschel mixer or in a mixing-granulating machine that can apply sufficient shearing force to the mixture.

A specific example of the feed mixture for the electrode material is described in the following. The agglomerate feed and graphite powder were mixed, and a conductivity promoter such as carbon black was added to the mixture, as necessary, and a bonding agent such as fluororesin was added, and the feed mixture was well blended to make a paste material. This paste material was painted on a metallic grid such as copper foil, stainless steel netting and dried to make electrodes in a sheet form or painted on a metallic grid and formed into a block form.

When graphite powder is used as the electrode active material in an electrode material, it can be used not only for making negative electrodes but for positive electrodes as well. In this case, negative electrode is made of metallic lithium.

When the electrode material is to be used for making a positive electrode in the lithium secondary battery, the electrode active material is a powder material of $LiCoO_2$, $LiMnO_2$ or a lithium oxide composite in which a part of Co and Mn is replaced with Co, Mn, Fe and Ni and the like.

Such lithium oxide composite materials are made by mixing carbonate salts and oxides of Li, Co, Mn, Fe, Ni and the like, sintering the mixture and pulverizing the sintered cake to make a powder material.

When the active material is made from a lithium oxide composite powder, carbon black and graphite powder are added as the conductivity promoter and the agglomerate feed is further added to the feed to produce an electrode material.

The requirement for mixing the feed powder is the same as discussed above, and it is necessary that sufficient shear force be applied in mixing the feed powder of lithium oxide composite.

The mixing ratio of the agglomerate feed should be between 5~20 w/o of the total weight of the mixture of lithium oxide composite, because if it is less than 5 w/o, the effect of adding the agglomerates is not observed, and if it exceeds 20 w/o, then the active material is reduced and the battery capacity is lowered.

The specific structure of the feed mixture based on the electrode material presented is the same as the structure described earlier.

The electrode material of the present invention can also be used for making electrodes for the sealed secondary lead battery (lead storage battery). Specific structure of the mixture of the electrode material for making positive electrodes is produced by mixing the agglomerate feed and a lead oxide powder as the active material, adding an aqueous solution of sulfuric acid to make a paste, painting the paste on a latticed structure, made of a lead alloy and the like, as the electron conductor, filling the grids and drying.

Also, specific structure of the mixture of the electrode material for making negative electrodes is produced by mixing a metallic lead powder as the active material and the agglomerate feed, adding an aqueous solution of sulfuric acid to make a paste, painting the paste on a latticed structure, made of a lead or lead alloy and the like, as the electron conductor, filling the grids and drying.

The electrode material of the present invention provides a large increase in the probability of making contacts between the individual particles and the carbon fibers because the particles are either incorporated into the cavities inside the agglomerate feed or tangled with the carbon fibers inside the agglomerate feed, thereby increasing the points of electrical contact significantly. Such a structure enables a large amount of electrical current to flow, because of a decrease in the internal resistance and an effective utilization of the active material for electrochemical reaction, leading to an increased charge storage capacity for the battery.

When graphite powder is used as the active material, in addition to the beneficial effects described above, the expansion phenomenon of the graphite particles caused by charge/discharge cycles is prevented because most of the graphite particles are incorporated into the micro-cavities in the agglomerate feed. Therefore, undesirable expansion and deformation of the electrodes are prevented, thereby increasing the service life of the battery by preventing a drop in the battery capacity caused by repeated cycles of charge/discharge.

Secondary batteries based on lithium ions, using the electrode material of the present invention, are made by winding a lamination comprised by a positive composite electrode in a sheet form and a negative composite electrode in a sheet form with a non-woven cloth separator made of polypropylene, for example, between the electrodes. Lead wires are attached to the grid of each composite electrode and the bulk assembly is housed in a can container and the container is filled with an electrolyte comprised by ethylene carbonate or ethylene carbonate having a dissolved lithium salt such as lithium perchlorate.

It is obvious that this is only one example of the method which can be used to make a battery structure using the electrode material of the present invention.

In the following, the invention will be demonstrated in terms of the preferred embodiments.

(Embodiment 1)

The VGCF (shortened to fibers hereinbelow) were molded by using a molding apparatus shown in FIG. 1 comprising a bottom plate 1, a cylindrical tube 2 and a plunger 3.

The fibers 4 were charged into the tube 2 and compressed with the plunger 3 at a pressure of 5 $kg/cm^2$.

The fibers 4 were comprised mostly by fibers of diameters between 0.1~0.5 μm and the fiber lengths between 5~50 μm, in which singular fibers and branching fibers were both present.

The pressed compacts measured 150 mm diameter by 200 mm length, and the apparent density was 0.06 $g/cm^2$.

The pressed compacts were heat treated in a sintering furnace held at 1,300° C. for 30 minutes/piece in a stream of argon. After cooling the compacts, they were rough ground in a mixing-granulating mill for 5 minutes, and pulverized further in a bantam mill.

The resulting material was comprised mostly by an agglomerate feed of flocs-like carbon fibers. About 82 w/o of the fibers were in the form of fiber agglomerates of sizes ranging between 6~300 μm, and the remainder was in the form of singular fibers.

Figure 2:
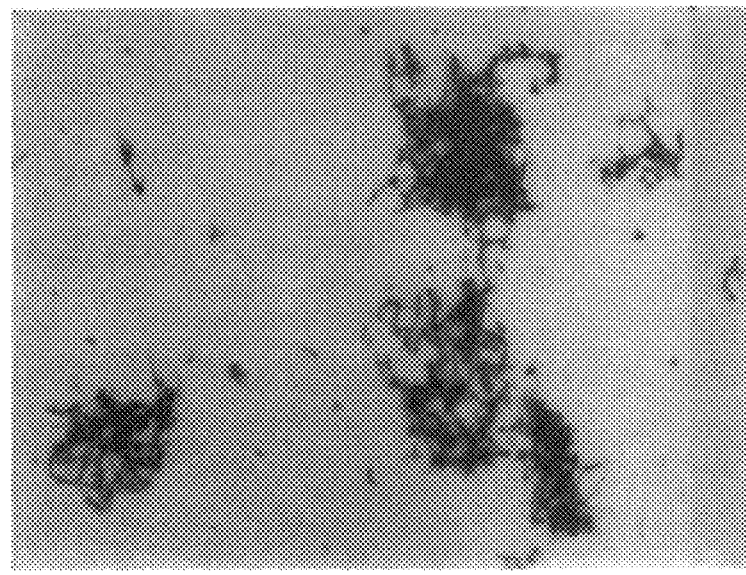
FIG. 2 is an optical micrograph (×500) of the carbon fiber material in Embodiment 1.
Figure 3:
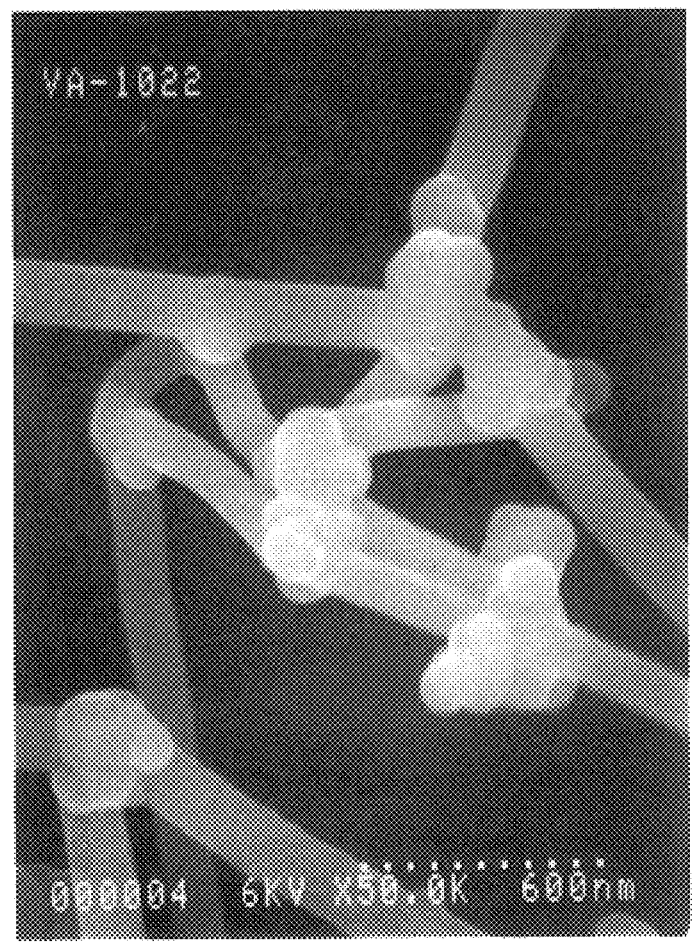
FIG. 3 is a scanning micrograph (×50,000) of the carbon fiber material in Embodiment 1.

FIG. 2 shows an optical micrograph of the pulverized fibers, and FIG. 3 shows the same fibers viewed under a scanning microscope. As seen in the optical micrograph in FIG. 2, the fibers form a three-dimensional structure made up of flocculated fibers. It can be seen in FIG. 3 that some of the fiber contact points are bonded. The contact points were viewed from different angles to confirm the bonding.

Figure 4:
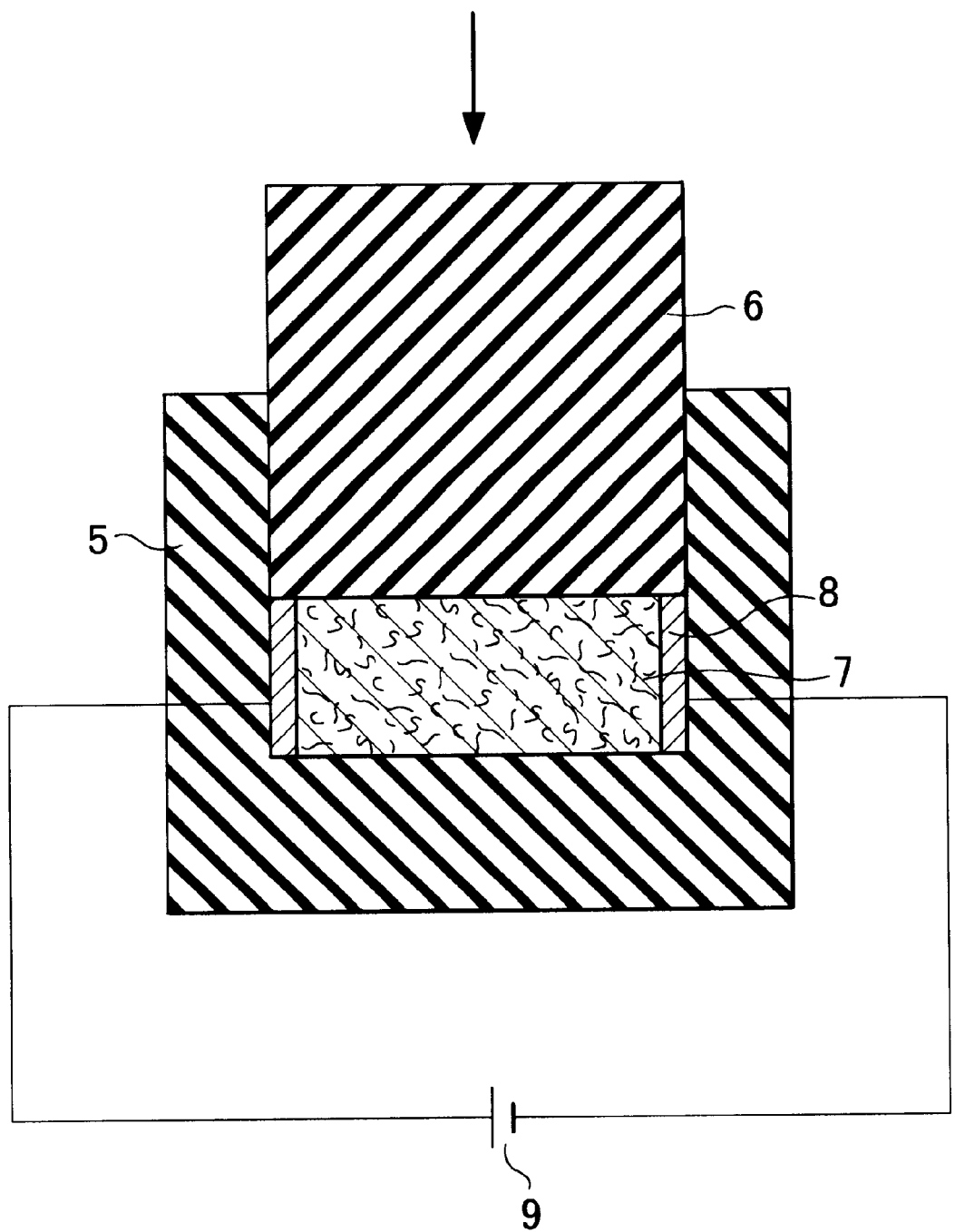
FIG. 4 is a cross sectional view of an electrical resistance measurement apparatus for a carbon fiber compacts.

The specific electrical resistance was measured using an apparatus shown in FIG. 4 to evaluate the electrical conductivity of the carbon fiber material. A 1.0 g quantity of the fibers 7 was packed in an electrically insulated cell 5 (a longitudinal inside dimension of 40 mm and a transverse inside dimension of 10 mm) and graphite plates 8 were placed on the lateral sides of the carbon fibers and were connected to a circuit having a power source 9. The fibers 7 was subjected to compression through a press block 6 so as to examine the relationship between the density of the pressed compacts and the specific electrical resistance.

Figure 5:
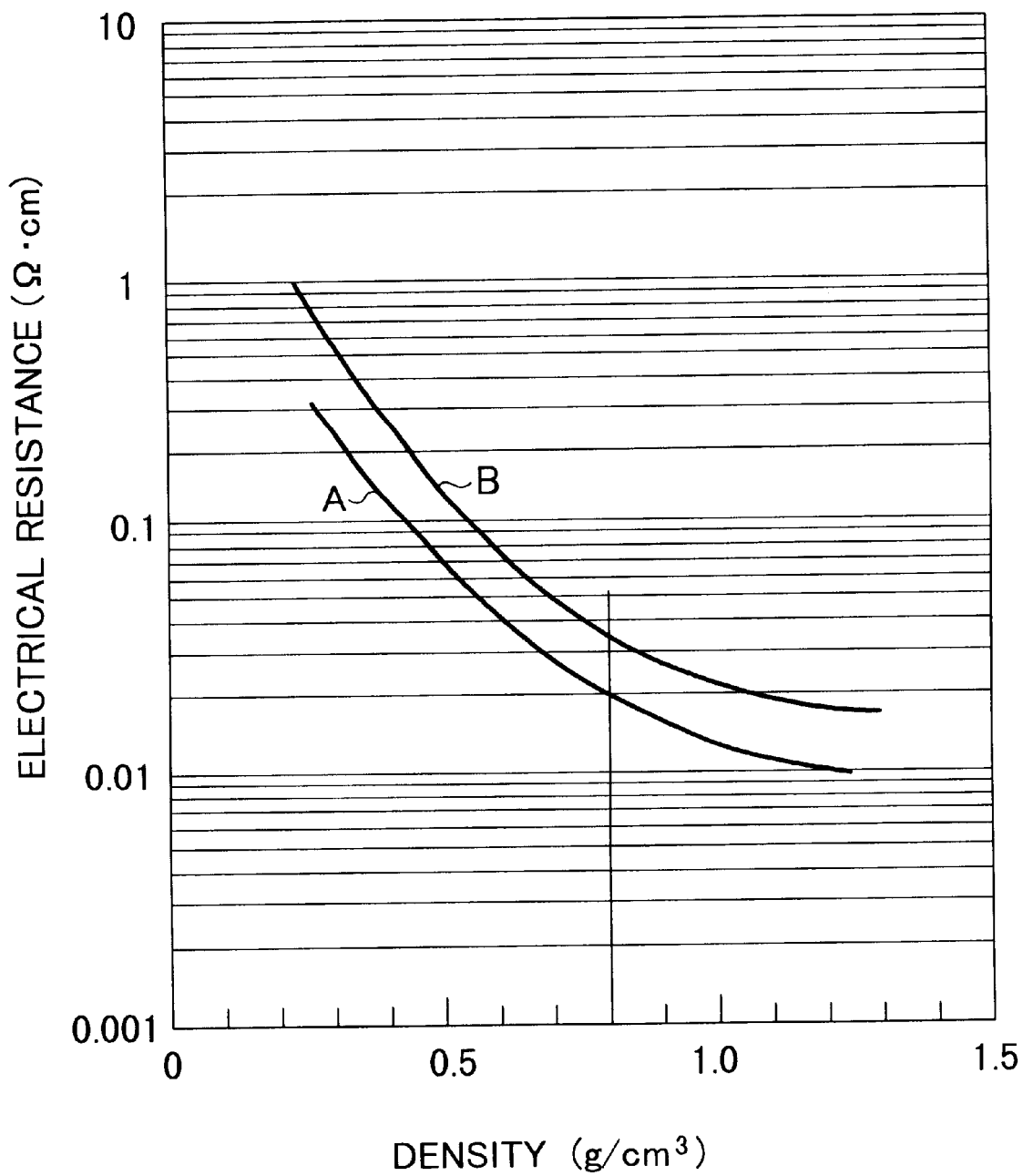
FIG. 5 is a graph showing a relationship between the density of the carbon fiber compacts and electrical resistance.

The experimental results are shown as curve A in FIG. 5.

(Comparison 1)

For comparison, the same fibers used in Embodiment 1 were placed in the heat treatment container without applying any compression, and heat treated at the same temperature. The heat treated fibers were ground in a bantam mill to produce powdered carbon fibers of 5~40 μm sizes. Variations in the electrical resistance were studied as before, and the results are shown as curve B in FIG. 5.

As shown in FIG. 5, the specific electrical resistance for a density of 0.8 g/cm$^3$ is 0.02 Ωcm in Embodiment 1 while in Comparison 1, the value is 0.035 Ωcm, indicating the superiority of the present fiber material.

(Embodiment 2)

The pressed compacts produced in Embodiment 1 was graphitized in a high frequency furnace at 2,800° C. in a stream of argon. After ascertaining that the center of the compacts has reached the temperature of 2,800° C., the sample was cooled and removed from the furnace. The compacts were crushed in a mixing-granulating machine and were ground further in a pulverizer.

The flocs-like fiber agglomerate was analyzed by X-ray diffraction, a value of doubling the plane spacing C was 6.785. The electrical resistance according to the method presented in Embodiment 1 was 0.015 Ωcm for an agglomerates density of 0.8 g/cm$^3$.

(Comparison 2)

Heat treated compacts produced in Comparison 1 were further heat treated at 2,800° C., and powdered carbon fibers were produced according to the method of Comparison 1. The electrical resistance was 0.027 Ωcm for a density of 0.8 g/cm$^3$.

(Embodiment 3)

The fibers obtained in Embodiment 1 were added at 2 w/o to an epoxy resin ("EPICOAT 819"/ethyleneglycol glycydylether/"EPICURE YH 300"), and the mixture was kneaded in a banbury mixer and subjected to press forming.

The electrical resistance of the formed product was 30 Ωcm.

(Comparison 3)

Using the singular fibers from Comparison 1, pressed compacts were produced according to the method of Embodiment 3, and their specific resistance was measured. The result was 90 Ωcm.

These results demonstrated that the carbon fiber material of the present invention had a superior resistance.

(Embodiment 4)

Activated charcoal powder having an average diameter of 13 μm and a specific surface area of 1,500 m$^2$/g was blended thoroughly with 5.0 w/o of carbon fibers having a specific surface area of 17 m$^2$/g and a fiber diameter of 0.15 μm and an agglomerate size of 15 μm and an electrical resistance of 0.016 Ωcm at a bulk density of 0.08 g/cm$^3$. A binder, made by dissolving a phenol resin (SHOWA HIGHPOLYMER CO. Ltd. "SHONOL BRL-120Z") in alcohol, was added at 7 w/o to the mixture. A plate of 12×12 cm was produced and sinter carbonized at 850° C. to produce carbon plates of 1 mm thickness. Square electrodes of 4×4 mm were produced from the plates.

Electrode plates were used in electric double-layer capacitors with a sulfuric acid electrolyte and the volumetric capacitance was measured.

The results showed volumetric specific capacitance of 21 F/cm$^3$ at a current flow of 0.5 amperes.

(Embodiment 5)

Activated charcoal powder having an average diameter of 9 μm and a specific surface area of 2,100 m$^2$/g was blended thoroughly with 5.0 w/o of carbon fiber materials having a specific surface area of 13 m$^2$/g and a fiber diameter of 0.15 μm and an agglomerate size of 120 μm and an electrical resistance of 0.021 Ωcm at a bulk density of 0.08 g/cm$^3$. A binder, made by dissolving a phenol resin (SHOWA HIGH-POLYMER CO. Ltd. "SHONOL BRL-120Z") in alcohol, was added at 7 w/o to the mixture. A plate of 12×12 cm was produced and sinter carbonized at 850° C. to produce carbon plates of 1 mm thickness.

Electrode plates were produced from the carbon plates to make electric double-layer capacitor according to the method of Embodiment 4, and the volumetric capacitance was measured.

The results showed a volumetric specific capacitance of 21 F/cm$^3$ at a current flow of 0.5 amperes.

(Embodiment 6)

Activated charcoal powder having an average diameter of 3.5 μm and a specific surface area of 1,900 m$^2$/g was blended thoroughly with 5.0 w/o of carbon fiber materials having a specific surface area of 13 m$^2$/g and a fiber diameter of 0.20 μm and an agglomerate size of 400 μm and an electrical resistance of 0.014 Ωcm at a bulk density of 0.08 g/cm$^3$. A binder, 10 w/o of polytetrafluoroethylene (PTFE) and alcohol, was added to the mixture and kneaded. The kneaded mixture was rolled to a strip of 0.7 mm thickness, and dried at 130° C. for 3 hours to produce carbon sheets.

Electrode plates were produced from the sheets to make electric double-layer capacitor according to the method of Embodiment 4, and the volumetric capacitance was measured.

The results showed a volumetric specific capacitance of 20 F/cm$^3$ at a current flow of 0.5 amperes.

(Embodiment 7)

The carbon fiber materials had a specific surface area of 13 m$^2$/g, a fiber diameter of 0.15 μm, an agglomerates size of 120 μm and the electrical resistance was 0.019 Ωcm at a bulk density of 0.08 g/cm$^3$, and 10 w/o of the fibers were added. All other conditions remained the same as those in Embodiment 4, and the specific capacitance of the resulting electrodes was measured.

The result was 19 F/cm³ at 0.5 amperes.
(Embodiment 8)
The addition of carbon fiber materials was 3 w/o, and other conditions remained the same as those in Embodiment 7. The electrodes were made and the specific capacitance was determined.
The result was 18 F/cm³ at 0.5 amperes.
(Embodiment 9)
The carbon fiber materials had a specific surface area of 13 m²/g, a fiber diameter of 0.19 μm, an agglomerate size of 200 μm and the electrical resistance was 0.017 Ωcm at a bulk density of 0.08 g/cm³, and 28 w/o of the carbon fiber materials were added. All other conditions remained the same as those in Embodiment 5, and the specific capacitance of the resulting electrodes was measured.
The result was 17 F/cm³ at 0.5 amperes.
(Embodiment 10)
The carbon fiber materials had a specific surface area of 13 m²/g, a fiber diameter of 0.20 μm, an agglomerate size of 120 μm and the electrical resistance was 0.017 Ωcm at a bulk density of 0.08 g/cm³, and 0.1 w/o of this carbon fiber materials were added. All other conditions remained the same as those in Embodiment 4, and the specific capacitance of the resulting electrodes was measured.
The result was 16 F/cm³ at 0.5 amperes.
(Embodiment 11)
The carbon fiber materials had a specific surface area of 13 m²/g, a fiber diameter of 0.15 μm, an agglomerate size of 50 μm and the electrical resistance was 0.10 Ωcm at a bulk density of 0.08 g/cm³, and 5.0 w/o of these carbon fiber materials were added. All other conditions remained the same as those in Embodiment 4, and the specific capacitance of the resulting electrodes was measured.
The result was 16 F/cm³ at 0.5 amperes.
(Comparison 4)
Activated charcoal powder with a specific surface area of 2,100 m²/g was blended with a binder at 7 w/o, a phenol resin (SHOWA HIGHPOLYMER CO. Ltd., "SHONOL BRL-120Z") dissolved in alcohol. Carbon plates of 1 mm thickness were produced by sinter carbonizing the mixture at 850° C. Electrode plates of 4×4 cm were produced from the carbon plates, and used in a double electrical layer capacitor of sulfuric acid type and their volumetric capacitance was determined.
The result was 15 F/cm³ at 0.5 amperes.
(Comparison 5)
The carbon fiber materials having a specific surface area of 13 m²/g, a fiber diameter of 0.15 μm, an agglomerate size of 20 μm and the electrical resistance was 0.017 Ωcm at a bulk density of 0.08 g/cm³, were added at 0.05 w/o which is less than the minimum value of the carbon fiber materials required. All other conditions remained the same as those in Embodiment 4, and the specific capacitance of the resulting electrodes was measured.
The result was 15 F/cm³ at 0.5 amperes.
(Comparison 6)
The carbon fiber materials having a specific surface area of 13 m²/g, a fiber diameter of 0.20 μm, an agglomerate size of 25 μm and the electrical resistance was 0.017 Ωcm at a bulk density of 0.08 g/cm³, were added at 35 w/o which is more than the maximum value of the carbon fiber materials required. All other conditions remained the same as those in Embodiment 4, and the specific capacitance of the resulting electrodes was measured.
The result was 14 F/cm³ at 0.5 amperes.
(Embodiment 12)
The high-resistivity carbon fiber materials had a specific surface area of 13 m²/g, a fiber diameter of 0.15 μm, an agglomerate size of 15 μm and the electrical resistance was 0.31 0 cm at a bulk density of 0.08 g/cm³, and 5.0 w/o of this material were added. All other conditions remained the same as those in Embodiment 4, and the specific capacitance of the resulting electrodes was measured.
The result was 15 F/cm³ at 0.5 amperes.
(Comparison 7)
Instead of the flocs-like carbon fiber materials used in Embodiment 4, the fiber diameter of this feed was 6 μm and the fiber length was 117 μm. A 5.0 w/o quantity of this singular fiber of VGCF was added. Other conditions remained the same as those in Embodiment 4. The resulting electrodes were evaluated for their specific volumetric capacitance.
The result was 15 F/cm³ at 0.5 amperes.
(Comparison 8)
Instead of the flocs-like carbon fiber materials used in Embodiment 6, the fiber diameter of this feed was 0.2 μm and the fiber length was 4 μm, the electrical resistance at a bulk density of 0.08 g/cm³ was 0.031 Ωcm, and a quantity of 5 w/o of this carbon fiber was added. Other conditions remained the same as those in Embodiment 6. The electrodes thus produced were evaluated for their specific volumetric capacitance.
The result was 14 F/cm³ at 0.5 amperes.
The results in Embodiments 4~12 and those from Comparisons 4~8 are summarized in Table 1.

TABLE 1

| | Carbon Powder | | | | Fiber Agglomerate Structure | | |
| --- | --- | --- | --- | --- | --- | --- | --- |
| | | | | | Aggl | Electric | |
| Emb. | Content % | Sur. Area m²/g | Amt. % | Diam μm | Size μm | Resist. Ωcm | Capa. F/cm³ |
| 4 | 95 | 1500 | 5.0 | 0.15 | 15 | 0.016 | 21 |
| 5 | 95 | 2100 | 5.0 | 0.15 | 120 | 0.021 | 21 |
| 6 | 95 | 1900 | 5.0 | 0.20 | 100 | 0.014 | 20 |
| 7 | 90 | 1500 | 10.0 | 0.15 | 120 | 0.019 | 19 |
| 8 | 97 | 1500 | 3.0 | 0.15 | 120 | 0.019 | 18 |
| 9 | 72 | 2100 | 28.0 | 0.19 | 200 | 0.07 | 17 |
| 10 | 99.9 | 1500 | 0.1 | 0.20 | 120 | 0.017 | 16 |
| 11 | 95 | 1500 | 5.0 | 0.15 | 50 | 0.10 | 16 |
| 12 | 95 | 1500 | 5.0 | 0.15 | 15 | 0.31 | 15 |
| Com. | | | | | | | |
| 4 | 100 | 2100 | 0 | — | — | | 15 |
| 5 | 99.95 | 1500 | 0.05 | 0.15 | 20 | 0.017 | 15 |
| 6 | 65 | 1500 | 35 | 0.20 | 25 | 0.017 | 14 |
| 7 | 95 | 1500 | 5.0 | 6 | | | 15 |
| 8 | 95 | 1500 | 5.0 | 0.2 | | 0.031 | 14 |

Note: The size of the agglomerates was determined by dispersing the ground fibers in alcohol, and the solution was dripped onto a glass plate to dry off the solvent, and the residue was observed under an optical microscope to measure the size of the flocs. An average of measurements was from about 100 flocs seen in several field of views.

Figure 6:
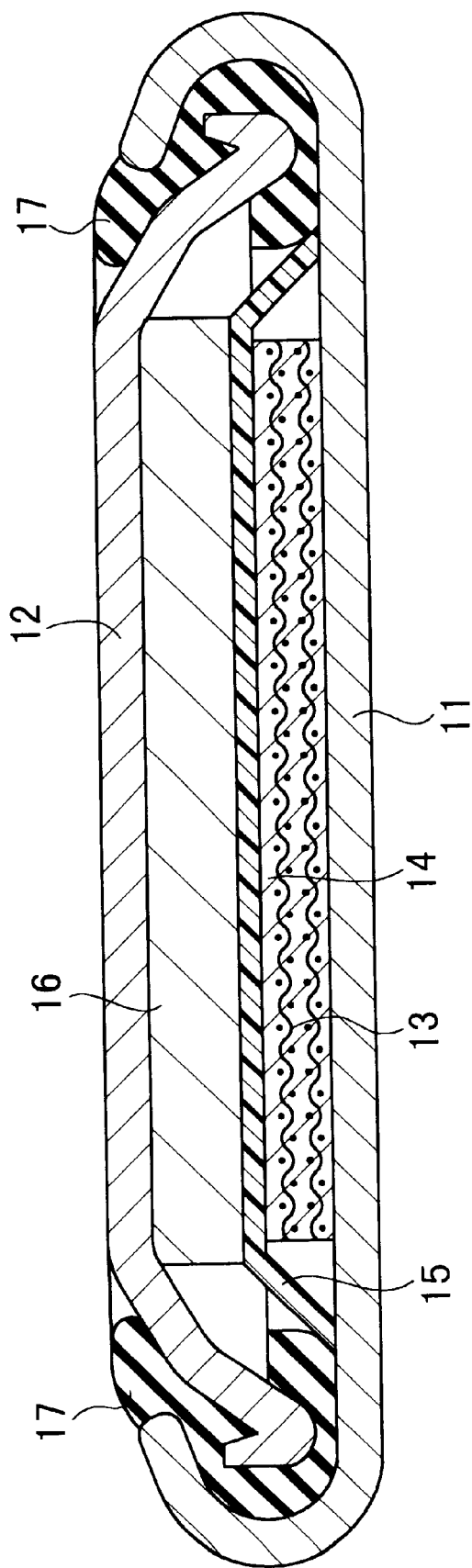
FIG. 6 is a schematic cross sectional view of a button battery in Embodiment 13.

(Embodiment 13)
In this embodiment, coin type lithium ion batteries shown in FIG. 6 were prepared using the electrodes made of the carbon fiber material.
The stainless steel battery case 11 was corrosion-resistant to the electrolyte, and the positive electrode grid 13 made of a stainless steel netting was spot welded to the inside of the case 11. A positive electrode was made by filling the positive electrode grid 13 with an electrode material 14.
The positive electrode material 14 was made by mixing 95 parts by weight of a graphite powder with 5 parts by weight of agglomerates, and 8 parts by weight of this mixture was blended with 2 parts by weight of a fluororesin binder in a Henschel mixer. A 0.2 μmass of this mixture was filled into the positive electrode grid 13.

The graphite powder was made by grinding the synthetic carbon electrode (with d002=0.338 nm) processed at 3,000° C. into particles of an average diameter of 5 μm. The agglomerate feed was made by press forming of branching fibers into compacts of apparent density of 0.06 g/cm$^3$, and heat treating the form at 1,300° C. and heating further at 2,800° C. for 5 minutes to graphitize, and grinding the graphitized compacts into fiber particles having agglomerate sizes between 100~300 μm (with d002=0.339 nm).

A fine-pore separator sheet 15 of polypropylene was placed on top of the positive electrode material 14, and on top of this separator 15, a circular disc negative electrode 16 of metallic lithium was placed. The negative electrode 16 was joined to a sealing plate 12 made of an electrolyte-resistant stainless steel plate. A packing 17 was made of polypropylene.

The electrolyte was made by dissolving LiPF$_6$ at 1 mol/liter in an equal-volume mixture of ethylene carbonate and diethycarbonate solvents.

The coin type battery was 20 mm in diameter and 16 mm in thickness.

(Comparison 9)

Synthetic graphite powder made in Embodiment 13 was used in a mixture consisting of 8 parts by weight of ground fiber and 2 parts by weight of a fluororesin binder and the mixture was blended in a Henschel mixer. The mixed powder at 0.2 g was used to fill the positive electrode grid 13. Other conditions remained the same as those in Embodiment 13.

(Comparison 10)

A gaseous mixture comprised by an organometallic compound of a transition metal, a carrier gas and a gaseous form of an organic compound was heated at a temperature between 800~1300° C. to produce floating fibers of VGCF containing fibers of an average diameter of 0.2 μm and length of 30 μm (above-mentioned Japanese Patent Application, First Publication (A), S60-54998). These VGCF were heated at 2,800° C. in argon to produce partially graphitized fibers. These partially converted carbon fibers at 5 parts by weight were mixed with 95 parts by weight of synthetic graphite powder, and 8 parts by weight of the mixed powder and 2 parts by weight of a fluororesin binder were blended in a Henschel mixer. The positive electrode grid 13 was filled with 0.2 g of the blended powder for forming into an electrode. Other condition remained the same as those in Embodiment 13 to produce coin type batteries.

Properties of the three kinds of coin type batteries produced in Embodiment 13, Comparisons 9 and 10 were examined for such characteristics as: internal resistance at 100 mHz, energy density per unit weight of positive electrode graphite powder and the number of charge/discharge cycles to failure.

Charging/discharging trials were performed under a constant discharge condition at a current density of 0.3 mA/cm$^2$, stop charge voltage of 3.0 volts and discharged voltage at 0 volt.

The results are summarized in Tables 2~4.

TABLE 2

| Battery | Internal Resistance (Ω) at 100 mHz |
| --- | --- |
| Embodiment 13 | 219 |
| Comparison 9 | 315 |
| Comparison 10 | 250 |

TABLE 3

| Battery | Energy Density (mAh/g) |
| --- | --- |
| Embodiment 13 | 340 |
| Comparison 9 | 240 |
| Comparison 10 | 280 |

TABLE 4

| Battery | Number of Charge/Discharge Cycles to Failure |
| --- | --- |
| Embodiment 13 | 402 |
| Comparison 9 | 78 |
| Comparison 10 | 290 |

(Embodiment 14)

The positive electrode produced in Embodiment 13 was made a negative electrode, and the stainless steel netting electrode grid was spot welded to the sealing plate.

The positive electrode was made by blending 80 parts by weight of LiCoO$_2$, 10 parts by weight of the agglomerates produced in Embodiment 13 and 100 parts by weight of a fluororesin binder in a Henschel mixer. A positive electrode grid of titanium netting and 0.4 g of this blended mixture were charged into the battery case to form battery samples. Other conditions were the same as those in Embodiment 13.

The batteries were tested under constant discharge condition at a current density of 2.0 mA/cm$^2$, stop charge voltage at 4.0 volts and stop discharge voltage of 2.7 volts.

The results showed that the energy density per unit weight was 140 mAh/g and after 500 charge/discharge cycles, the battery retained 94% of the initial current density.

(Comparison 11)

The conditions were the same as those in Embodiment 14 except that the positive electrode was made by mixing 8 parts by weight of LiCoO$_2$, 1 part by weight of acetylene black and 1 part by weight of a fluororesin binder in a Henschel mixer, and 0.4 g of the mixture was used to make coin type battery samples.

The battery samples were tested under the same condition as those in Embodiment 14, and the it was found that the energy density by unit weight was 120 mAh/g and the battery retained 70% of the initial energy density after 500 cycles.

(Comparison 12)

The conditions were the same as those in Embodiment 14 except that the positive electrode was made by mixing 8 parts by weight of LiCoO$_2$, 1 part by weight of the VGCF used in Embodiment 10 and 1 part by weight of a fluororesin binder in a Henschel mixer, and 0.4 g of the mixture was used to make coin type battery samples.

The battery samples were tested under the same condition as those in Embodiment 14, and the it was found that the energy density by unit weight was 130 mAh/g and the battery retained 78% of the initial energy density after 500 cycles.

The present invention may be embodied in other specific forms without departing from the spirit or essential characteristics thereof. The present embodiments therefore are to be considered in all respects as illustrative and not restrictive, the scope of the invention being indicated by the appended claims rather than by the forgoing descriptions and all changes which come within the meaning and range of equivalency of the claims are therefore intended to be embraced therein.

What is claimed is:

1. A carbon fiber material comprised substantially by fiber agglomerates, having agglomerate sizes in a range of not less than 5 µm and not more than 500 µm, formed by vapor grown carbon fibers having a diameter of not less than 0.05 µm and not more than 5 µm wherein at least a fraction of fiber contact points are bonded together with substances produced by carbonizing carbonaceous matters.

2. A material according to claim 1, wherein said fiber agglomerates are comprised by flocs fibers.

3. A method for making a carbon fiber material comprising the steps of: making carbon fibers having a diameter of not less than 0.05 µm and not more than 5 µm by a vapor phase growth method; press forming of carbon fibers obtained to produce compacts having an apparent density of not less than 0.02 g/cm$^3$; heating said compacts at a temperature of not less than 600° C.; pulverizing heat treated compacts by shear or compressive forces to produce fiber agglomerates having agglomerate sizes ranging from not less than 5 µm and not more than 500 µm.

4. A method according to claim 3, wherein said press forming is performed at a compaction pressure of not less than 0.1 kg/cm$^2$.

5. An electrode material for an electric double-layer capacitor comprising a carbon powder having a specific surface area of not less than 500 m$^2$/g and carbon fiber materials in a range of 0.1 weight percent to 30 weight percent, wherein said carbon fiber materials are comprised substantially by fiber agglomerates, having agglomerate sizes in a range of not less than 5 µm and not more than 500 µm, formed by vapor grown carbon fibers having a diameter of not less than 0.05 µm and not more than 5 µm wherein at least a fraction of fiber contact points are bonded together with substances produced by carbonizing carbonaceous matters.

6. An electrode material according to claim 5, wherein said fiber agglomerates are comprised by flocs fibers.

7. An electrode material according to claim 5, wherein said carbon fiber material has an electrical resistance of not more than 0.3 Ωcm at a bulk density of 0.08 g/cm$^3$.

8. An electrode material according to claim 5, wherein said carbon fiber material has a specific surface area of not more than 20 m$^2$/g.

9. An electrode material according to claim 7, wherein said carbon fiber material has a specific surface area of not more than 20 m$^2$/g.

* * * * *